United States Patent Office 3,012,051
Patented Dec. 5, 1961

3,012,051
PROCESS FOR THE PRODUCTION OF POLY-
SILOXANES CONSISTING SUBSTANTIALLY
OF DIORGANO-SILOXANE CHAINS AND
BEARING DIFFERENT SUBSTITUENTS
Karl Schnürrbusch and Walter Simmler, Koln-Mulheim,
and Walter Noll, Leverkusen-Bayerwerk, Germany,
assignors to Farbenfabriken Bayer Aktiengesellschaft,
Leverkusen, Germany, a corporation of Germany
No Drawing. Filed May 22, 1958, Ser. No. 736,974
Claims priority, application Germany May 24, 1957
1 Claim. (Cl. 260—448.2)

This invention relates to the production of polysiloxanes which contain in one molecule different hydrocarbon radicals bonded to silicon.

It is well known that of all organic compounds of silicon, next to the methyl substituted silanes and siloxanes, the phenyl derivatives have found the widest technical application, since certain properties of the merely methyl substituted siloxanes are improved by the introduction of phenyl radicals. Apart from the technically disadvantageous Grignard method of production, hetero-substituted silane derivatives were produced by means of an exchange reaction between phenyl trichlorosilane and trimethylchlorosilane or dimethyl dichlorosilane, and according to another proposal by reaction of methyl hydrogen dichlorosilane with benzene. Both these processes are conducted under pressure and thus require special apparatus; they permit less satisfactory yields and are further fraught with the great difficulty of separating the phenyl methyl dichlorosilane (B.P. 204° C.), from the only slightly lower boiling phenyl trichlorosilane usually produced as by-product (B.P. 201.5° C.).

It has also been proposed to apply the readily available diphenyl dichlorosilane as the phenyl component, either by hydrolyzing a mixture of diphenyl dichlorosilane and dimethyl dichlorosilane, mixing the hydrolysis product with hexamethyl disiloxane and subjecting this mixture to the reaction known as "equilibration," or first hydrolyzing the diphenyl dichlorosilane to diphenyl silanediol and then subjecting this in admixture with di- and trimethylsiloxanes to the equilibration reaction. Both these processes have the disadvantage that polysiloxanes relatively poor in phenyl groups are produced. In the joint hydrolysis of dimethyl- and diphenyl-dichlorosilane and the simultaneously proceeding condensation of the hydrolysate, at high phenyl proportions in the mixture greater quantities of solid products precipitate, as a result of the differing hydrolysis velocities of the two chlorosilanes, so that a phenyl content of at the most 20 phenyl radicals per 100 hydrocarbon radicals can be obtained. The aforesaid equilibration with diphenyl silanediol permits considerably still less phenyl siloxane to be interpolymerized, because the catalyst for this reaction, e.g. concentrated sulfuric acid, becomes inactive after the reaction has continued for a short time, which is due to the water emanating from the silanediol.

Higher phenyl contents can indeed be reached in polysiloxanes by reacting diphenyl silanediol with for example dimethyl diethoxy silane, but here too, solids precipitate. Therefore, it has already been proposed to react dimethyl dichlorosilane with disodium diphenyl silanediolate, but this process is inconvenient since the sodium silanolate must additionally be produced by way of diphenyl dialkoxy silane or octaphenyl cyclotetrasiloxane.

In accordance with the invention all the aforementioned limitations and difficulties are avoided by a certain sequence of known individual reaction steps, leading in very simple fashion from the hydrolyzable silanes to the mixed-substituted polysiloxanes. In contrast to the known proposals of a similar kind, according to which either the methyl- and the phenyl component were mixed as hydrolyzable organosilane derivatives and then hydrolyzed, or each of these components was first hydrolyzed individually and then brought together with the other component, the principal characteristic of the present invention consists in that the methyl substituted chlorosilanes are first hydrolyzed alone and condensed to polysiloxanes, and that to these, after removal of the water split off, the phenyl components are mixed in the unhydrolyzed state, i.e. as hydrolyzable diphenyl silane derivatives, and then hydrolyzed in the manner more fully described in the following. According to a preferred embodiment of the process the equilibration reaction between the hydrolysis products of dimethyl dichlorosilane and trimethylchlorosilane is first carried out in the usual manner, obtaining water-free liquid methyl polysiloxanes which consist of linear dimethyl siloxanes which are chain-stopped with trimethyl siloxane groups. These methyl polysiloxanes contain either small quantities of the still active equilibration catalyst acid, such as sulphuric acid, phosphoric acid, hydrohalic acid, acid anhydrides or ansolvo acids, or they are admixed with them. If now diphenyl dichlorosilane is admixed and water added in small portions in the quantity required for complete hydrolysis of the chlorosilane, there are surprisingly obtained, even at any high phenyl: methyl ratios without precipitation of solids, siloxane chains which contain all the phenyl radicals in random distribution, i.e. homogeneously interpolymerized, and whose average length is determined by the ratio of the sum of dimethyl-siloxy and diphenyl-siloxy units to the number of trimethyl-siloxy groups, whereby the viscosity of the finally obtained organopolysiloxane oil may be controlled, as known in the equilibration reaction.

It is not necessary that the first equilibration step between the methyl-substituted siloxanes be completed before the diphenyl dichlorosilane is admixed. As hydrogen chloride is formed in the hydrolysis of the diphenyl dichlorosilane and itself acts as equilibration catalyst, the original concentration of acid in the reaction mixture may be very small, and since in contrast to the known silanediol condensation no water results, the catalyst remains undiminished in activity. The hydrolysis once initiated also provides a great part of the energy needed for heating. The quantity of water used is at least 1 mol for each mol of dichlorosilane, and should preferably not be exceeded by more than 5%, so long as visible hydrogen chloride appears, so that the activity of the equilibration catalyst continues to the end of the reaction. It is assumed that the catalyst passes through an intermediate product—in the case of sulphuric acid, a silyl sulphate; this would be decomposed hydrolytically by free water, with formation of silanediol. The water addition itself is so measured, at first in small portions, later in larger ones, for example over two hours, that evolution of gas does not give rise to disturbances or losses. When appreciable gas development has finished, more water can be added, for example 20% of the stoichiometric amount, to make certain that no chlorosilane residues remain. The working up of the crude product proceeds according to known methods.

In a similar manner one can introduce, instead of the diphenyl silyl groups, other difunctional silyl groups, e.g. mono- or dialkylsilyl, mono- or dialkenylsilyl, mono- or di-alkarylsilyl, including difunctional silyl groups with substituted hydrocarbon radicals, e.g. fluoromethyl and chlorophenyl. Instead of the merely methyl-substituted starting polysiloxane, other organopolysiloxanes can be adopted. Furthermore another halogen can take the place of the chlorine. In the application of this process to condensation of for example methylsiloxanes with diphenyl dichlorosilanes, the siloxane chains can be branched, since as is known, by the catalytic action of hydrogen halide, cleavage of phenyl radicals occurs, which are replaced by halogen with formation of benzene, so that the condensation can lead to cross-linking. This can be avoided by using a diaryl dialkoxy silane as diarylsilane derivative, whose alkoxy groups are easily hydrolyzed, preferably diaryl-diethoxy silane. Even in this case, the water may only be added in small quantities, so that the presence of sufficient water in the mixture to cause diaryl silanediol to precipitate is avoided.

Hence, the process according to the invention comprises treating a mixture, containing a known equilibration catalyst, of a linear triorganosiloxy chain-stopped diorgano polysiloxane and a readily hydrolyzable organo silane derivative, whose hydrocarbon radicals are at least partly different from those of the aforesaid diorgano polysiloxane, and which is a mono-organo or diorgano-dihalosilane or a mono-organo or diorgano-dialkoxy silane, at elevated temperature in portions in the course of 1–2 hours with such a quantity of water that at least 1 mol is used for each mole of the said organosilane derivative and at most so much that the activity of the equilibration catalyst is maintained, and then heating for some time to remove the volatile reaction products.

An important advantage of the invention consists in that the ratio of the various substituents of the accordingly produced polysiloxanes and their viscosity, are not limted. It is especially to be noted that the readily available starting materials of the process require no special purification or preparation.

The products made according to this process belong to a class of compounds known as such, which have for a long time found many applications; the diphenyl siloxane-dimethyl siloxane mixed polymers for example are outstanding heat transfer agents and mixture components in the production of heat stable greases.

The present invention is further illustrated by the following examples without being restricted thereto.

*Example 1.—(Diphenyl siloxane:dimethyl siloxane= 27:73)*

1000 grams of polydimethyl siloxane, which has been obtained in usual manner from dimethyl dichlorosilane by hydrolysis, is heated with 300 grams of hexamethyl disiloxane and 20 grams of concentrated sulphuric acid to about 85° C. Then 1280 grams of diphenyl dichlorosilane were first admixed, and in the course of two hours, 95 grams of water in small portions, so that the at first heavy hydrogen chloride evolution remains at controllable speed. After completing the addition of water, the reaction mixture is again kept between 110° and 120° C. for a further two hours, to complete the equilibration reaction. The acid product is neutralized with sodium carbonate, filtered and heated under reduced pressure to remove the volatile products. The remaining phenyl methyl polysiloxane oil has a viscosity of 540 cp. and a flash point of 286° C. In the following Examples 2–8 the procedure of Example 1 is followed, but with the alterations given in the following:

*Example 2.—(Diphenyl siloxane:dimethyl siloxane= 50:50)*

2000 grams of hexamethyl disiloxane were used, with 27 grams of sulphuric acid, 3410 grams diphenyl dichlorosilane and 243 grams of water. The oil so obtained has a viscosity of 340 cp. and a flash point of 275° C.

*Example 3.—(Diphenyl siloxane:dimethyl siloxane= 16:84)*

There were used only 115 grams of hexamethyl disiloxane, 10 grams of sulphuric acid, 640 grams of diphenyl dichlorosilane and 46 grams of water. The oil obtained has a viscosity of 1350 cp. and a flash point of 320° C.

*Example 4.—(Diethyl siloxane: dimethyl siloxane=17:83)*

There were used: 140 grams of hexamethyl disiloxane and 7 grams of sulphuric acid, 425 grams of diethyl dichlorosilane instead of the diphenyl dichlorosilane of the previous examples were added; the water amounted to 50 grams. The ethyl methyl polysiloxane oil so obtained has a viscosity of 50 cp. and a flash point of 303° C.

*Example 5.—(Ethyl-(bromophenyl)-siloxane: dimethyl-siloxane=17:83)*

100 grams of hexamethyl disiloxane were used, with 13.3 grams of sulphuric acid. In place of the diphenyl dichlorosilane of Example 1, 800 grams of ethyl-(bromophenyl)-dichlorosilane were added; the quantity of water was 51 grams. The oil thus obtained has a viscosity of 500 cp. and a flash point of 312° C.

*Example 6.—(Methyl vinyl siloxane: dimethyl siloxane=40:60)*

160 grams of hexamethyl disiloxane were used, and 10 grams of sulphuric acid. In place of the diphenyl dichlorosilane of Example 1, 1280 grams of methyl vinyl dichlorosilane were added; the quantity of water came to 165 grams. The methyl vinyl polysiloxane oil obtained therefrom has a viscosity of 74 cp. and a flash point above 300° C.

*Example 7.—(Methyl hydrogen siloxane:dimethyl siloxane=22:78)*

140 grams of hexamethyl siloxane were used, with 7 grams of sulphuric acid. In place of the diphenyl dichlorosilane of Example 1 there were added 670 grams of methyl hydrogen dichlorosilane; the quantity of water amounted to 104 grams. In view of the liability to hydrolysis of the Si-H linkage in alkaline medium, the acid reaction product must not be neutralized with soda; it is only thoroughly washed out with water. The methyl hydrogen polysiloxane oil remaining after removal of the volatile parts, has a viscosity of 68 cp. and a flash point of 270° C. The hydrogen, removable by alkaline hydrolysis, amounts to 0.62 weight percent of the oil.

*Example 8.—(Diphenyl siloxane:dimethyl siloxane=16:84)*

140 grams of hexamethyl disiloxane were used, and in distinction from the previous examples in place of the sulphuric acid catalyst there were used 7 grams of phosphorus pentoxide. There were also used as in Example 3, 640 grams of diphenyl dichlorosilane and 46 grams of water. The oil obtained therefrom, whose polysiloxane chains between the trimethyl siloxy end groups are made from both diphenyl siloxy and dimethyl siloxy units, has a viscosity of 400 cp. and a flash point of 308° C.

*Example 9.—(Diphenyl siloxane: dimethyl siloxane=17:83)*

In a half litre flask fitted with a small fractionating column, 185 grams of a polydimethyl siloxane, made from dimethyl dichlorosilane by hydrolysis in conventional manner, are mixed with 16 grams of hexamethyl disiloxane, 136 grams of diphenyl diethoxy silane and 3 grams of concentrated sulphuric acid and heated to 90° C. with stirring. To this mixture there were added dropwise at this temperature in the course of one hour, 12 grams of water, the temperature and stirring being maintained for a further two hours. The alcohol resulting from the reaction meanwhile distils over in the column. Then the cooled contents of the flask are neutralized with soda or with alcoholic alkali, filtered, blown through with nitrogen to remove volatile constituents in known manner at temperatures between 150° and 200° C. under reduced pressure, and again filtered. The filtrate is a clear colourless phenyl methyl polysiloxane oil with a viscosity of 428 cp. at 20° C.

*Example 10.—(Diphenyl siloxane: dimethyl siloxane=50:50)*

The process is conducted in the same manner as in Example 9 and with the same reaction components, but in other proportions: 75 grams of the polydimethyl siloxane, 34 grams of the hexamethyl disiloxane, 272 grams of diphenyl diethoxy silane, 3 grams of sulphuric acid and 25 grams of water. The clear colourless phenyl methyl polysiloxane oil obtained has a viscosity of 444 cp. at 20° C.

What we claim is:

Process for the production of linear alkyl arylpolysiloxanes which comprises treating a mixture of a linear trialkyl-siloxy chain-stopped dialkylpolysiloxane and a di-aryl-dialkoxysilane in the presence of an equilibration catalyst which is a member selected from the group consisting of sulfuric acid, phosphoric acid, hydrohalic acid, acid anhydrides and ansolvo acids, at a temperature of between 80 and 120° C., in portions, in the course of 1 to 2 hours with such a quantity of water that at least 1 mol is used for each mol of diaryl-dialkoxysilane and at most so much that the activity of the said equilibration catalyst is maintained and thereafter heating the mixture until the alcohol resulting from the reaction has been substantially removed.

References Cited in the file of this patent

UNITED STATES PATENTS

| | | |
|---|---|---|
| 2,469,888 | Patnode | May 10, 1949 |
| 2,486,162 | Hyde | Oct. 25, 1949 |
| 2,637,719 | Dereich | May 5, 1953 |

FOREIGN PATENTS

| | | |
|---|---|---|
| 1,145,022 | France | Apr. 29, 1957 |
| 1,011,420 | Germany | July 4, 1957 |
| | (Kl. 12o 26/03) | |